United States Patent [19]

Nagata et al.

[11] 4,113,682
[45] Sep. 12, 1978

[54] COATING COMPOSITION CONTAINING RESIN HAVING TERTIARY ALIPHATIC GROUP AND REACTIVE HYDROXYL GROUP, PROCESS FOR ITS PREPARATION AND ARTICLE COATED WITH THE COMPOSITION

[75] Inventors: Nobuyoshi Nagata, Nara; Ryuzo Mizuguchi, Osaka, both of Japan

[73] Assignee: Nippon Paint Co., Ltd., Osaka, Japan

[21] Appl. No.: 699,025

[22] Filed: Jun. 23, 1976

Related U.S. Application Data

[63] Continuation-in-part of Ser. No. 439,797, Feb. 5, 1974, abandoned, which is a continuation of Ser. No. 163,492, Jul. 21, 1971, abandoned, which is a continuation-in-part of Ser. No. 732,526, May 28, 1968, abandoned.

[30] Foreign Application Priority Data

Jun. 2, 1967 [JP] Japan ............................ 42-34872

[51] Int. Cl.$^2$ ...................... C08L 61/28; C08L 61/24
[52] U.S. Cl. ...................... 260/29.4 UA; 204/181 C; 260/39 R; 260/851; 260/856; 428/460
[58] Field of Search .............. 260/29.4 UA, 29.6 TA, 260/851, 856, 834; 204/181

[56] References Cited

U.S. PATENT DOCUMENTS

| | | | |
|---|---|---|---|
| 3,330,814 | 7/1967 | Vasta | 260/844 |
| 3,403,088 | 9/1968 | Hart | 204/181 |
| 3,505,128 | 4/1970 | Fujii et al. | 260/29.4 UA |
| 3,516,913 | 6/1970 | Sekmakas et al. | 204/181 |
| 3,544,505 | 12/1970 | Nagata et al. | 260/851 |

Primary Examiner—Theodore E. Pertilla
Attorney, Agent, or Firm—Beveridge, Degrandi, Kline & Lunsford

[57] ABSTRACT

A coating composition capable of producing a coating film having excellent water-proof property, solvent-resistant property, chemical-resistant property, thermal stability and hardness, which comprises water, a water-soluble solvent and a water-soluble, thermosetting resin as essential, film-forming component, which resin is prepared by (A) adding an amine to 100 parts by weight of a copolymer obtained by the copolymerization of (1) 5 to 30 parts by weight of an $\alpha,\beta$-ethylenically unsaturated acid component, (2) 5 to 50 parts by weight of an addition product component containing hydroxyl group and a tertiary aliphatic group having 4 to 26 carbon atoms, (3) 40 to 90 parts by weight of a hydroxy-free, polymerizable, unsaturated monomer component and (4) up to 20 parts by weight of a polymerizable unsaturated monomer component having a hydroxyl group in its molecule, the amount of said amine being 0.5 to 2.0 equivalent with respect to the carboxyl group in said copolymer, to form a water-soluble salt; and (B) adding to said salt 4 to 50 parts by weight of a water-soluble amino resin. A process for preparing the coating composition and an article coated with the composition are provided.

28 Claims, No Drawings

COATING COMPOSITION CONTAINING RESIN HAVING TERTIARY ALIPHATIC GROUP AND REACTIVE HYDROXYL GROUP, PROCESS FOR ITS PREPARATION AND ARTICLE COATED WITH THE COMPOSITION

CROSS-REFERENCES TO RELATED APPLICATIONS

This is a continuation-in-part of our copending application, Ser. No. 439,797, filed Feb. 5, 1974, now abandoned, which is a continuation of application Ser. No. 163,492, filed July 21, 1971 and abandoned now, which is a continuation-in-part of application Ser. No. 732,526, filed May 28, 1968 and abandoned now.

BACKGROUND OF THE INVENTION

The present invention relates to heat-cross-linking type water-soluble coating materials obtained by converting copolymers having a carboxyl group, a hydroxyl group and a tertiary aliphatic group into amine salts to render the same soluble in water and combining said amine salts with water-soluble amino resins.

Processes for producing copolymers of α,β-ethylenically unsaturated carboxylic acids, such as acrylic acid or methacrylic acid, and polymerizable unsaturated polymers, and water-soluble salts thereof, are well known.

SUMMARY OF THE INVENTION

The primary object of the present invention is to obtain a hardened coating film having excellent water-proof property, solvent-resistant property, chemical-resistant property, thermal stability and hardness, by preparing a water-soluble amine salt of a copolymer by introducing into such a copolymer as described above a hydroxyl group and a tertiary aliphatic group, and by making use of the condensation reaction between the hydroxyl group and the water-soluble amino resin contained in said copolymer, which takes places on heating.

The coating film obtained according to the present invention is characterized by its excellent appearance, flexibility, weather-proof property and durability, which are brought about by the tertiary aliphatic group present therein.

In the present invention, the following methods are used for introducing a tertiary aliphatic group into the copolymers:

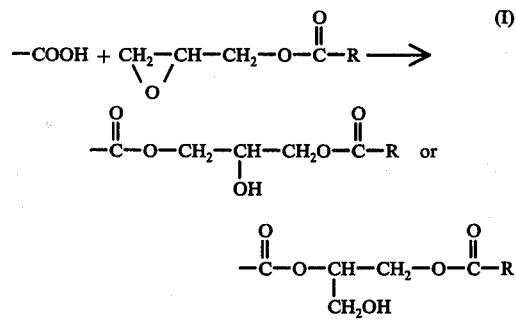

wherein R represents a tertiary aliphatic alkyl group having 4 to 26 carbon atoms, or

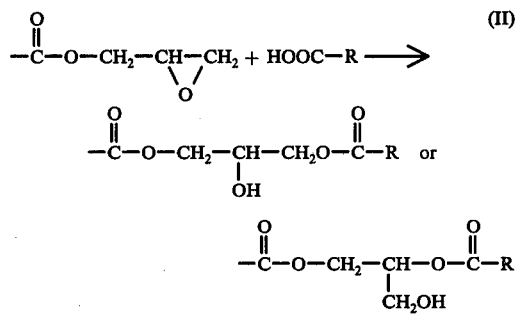

wherein R represents a tertiary aliphatic alkyl group having 4 to 26 carbon atoms.

That is to say, the tertiary aliphatic group is introduced by either the addition reaction of the carboxyl group of a polymerizable α,β-ethylenically unsaturated carboxylic acid with the epoxy group of a glycidyl ester of tertiary aliphatic monocarboxylic acid or the addition reaction of the epoxy group of a monoglycidyl ester of polymerizable α,β-ethylenically unsaturated carboxylic acid with a tertiary aliphatic monocarboxylic acid. This addition reaction is effected before the copolymerization reaction. By these addition reactions, a hydroxyl group is also introduced into the copolymer along with the tertiary aliphatic group. In the present invention, a hardened coating film is obtained by making use of the condensation reaction between the hydroxyl group contained in the copolymer and an amino resin under heated conditions. Since the amount of the hydroxyl group resulting from the addition reaction is not sufficient for the desired coating composition, a polymerizable unsaturated monomer having a hydroxyl group in its molecule, such as 2-hydroxyethyl methacrylate or allyl alcohol, is used as a comonomer.

That is, the present invention provides a coating composition characterized by containing water, a water-soluble, organic solvent and a water-soluble, thermosetting resin as essential, film-forming component, which resin is obtained by A. adding an amine to 100 parts by weight of a copolymer obtained by the copolymerization of (1) 5 to 30 parts by weight of an α,β-ethylenically unsaturated carboxylic acid component, (2) 5 to 50 parts by weight of an addition product component having a tertiary aliphatic group containing 4 to 26 carbon atoms and a hydroxyl group as mentioned previously, (3) 40 to 90 parts by weight of a hydroxy-free polymerizable, unsaturated monomer component, and (4) up to 20 parts by weight of a polymerizable unsaturated monomer component having a hydroxyl group, the amount of said amine being 0.5 to 2.0 equivalents with respect to the carboxyl group in said copolymer, to form a water-soluble salt, and B. adding to said salt 4 to 50 parts by weight of a water-soluble amino resin.

DETAILED DESCRIPTION

α,β-Ethylenically unsaturated carboxylic acids usable for A(1) above include α,β-ethylenically unsaturated mono- and di-carboxylic acids, preferably having 3 to 5 carbon atoms, such as acrylic acid, methacrylic acid, crotonic acid, itaconic acid, maleic acid, maleic anhydride fumaric acid and monoesters of these acids with alkanols having 1 to 4 carbon atoms. Use of an α,β-ethylenically unsaturated carboxylic acid in an amount of less than 5 parts by weight will not give the desired water-soluble salt of copolymer, while the use of the same in an amount of more than 30 parts by weight does not bring about any particular advantage though not detrimental.

The component A(2) is introduced by methods which are generically classified into methods (I) and (II) aforesaid. In the case of method (I), as the α,β-ethylenically unsaturated carboxylic acid, there may be used those mentioned for A(1). As the glycidyl ester of tertiary aliphatic monocarboxylic acid, there may be used, for example, Cardula E, which is a glycidyl ester of Versatic 911, which in turn is a mixture of saturated, mainly tertiary monocarboxylic acids of $C_9$, $C_{10}$, $C_{11}$ in chain length. It is made from olefins, water and carbon monoxide in the presence of a strong acid catalyst according to the following reaction:

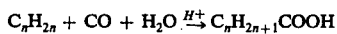

The proportion of secondary and tertiary acids present in the mixture is approximately 10 percent and 90 percent, respectively; there is no measurable primary acid content. The structure of Versatic 911 can therefore be represented as follows:

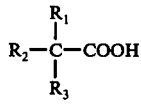

Analysis has shown that at least one of these three R groups is always methyl. All three alkyl groups are themselves basically straight chain. Also a small proportion of the tertiary acids present are cyclic acids, principally pentane ring cyclics. In the case of method (II), glycidyl acrylate or glycidyl methacrylate may be used as monoglycidyl ester of α,β-ethylenically unsaturated carboxylic acid. The tertiary aliphatic monocarboxylic acids used include neo-alkanoic acids having 5 to 28 carbon atoms, such as neopentanoic acid, neoheptanoic acid, neodecanoic acid and neotridecanoic acid. Also, mixtures of these neo-acids, for example, Versatic 911 can be used.

At present, a considerable number of water-soluble, polymeric resin-type coating materials, consisting primarily of acrylic acid or methacrylic acid or an ester of the acid are used. While these polymeric resin-type coating materials have meritorious features in respect of hardness, weather-proof property, durability, color retaining property and stain-proof property on one hand, they are not entirely satisfactory in respect of compatibility with amino resins or other resins, adhesive property to materials to be coated and between the same or different kinds of coating materials, and appearance of the resultant coating, particularly "bulky appearance," surface characteristics and gloss. These unsatisfactory properties are mainly attributed to the fact that the conventional polymeric coating materials consist of typical, linear, high molecular weight compounds having a relatively short side chain. The present invention has eliminated the aforesaid unsatisfactory properties, without degrading the inherent meritorious features of the coating materials, by introducing in the side chain a tertiary aliphatic alkyl group which is bulky and affinitive to oil and has a strong resistance against detrimental actions of chemicals, light and oxidation. For this purpose, the component A(2) must be introduced in the copolymer in an amount of at least 5 parts by weight, preferably up to 50 parts by weight.

Any conventional hydroxy-free polymerizable unsaturated monomers, preferably those having 2 to 30 carbon atoms, can be used as the component A(3) and include, for example, acrylates or methacrylates of alkanols having 1 to 16 carbon atoms, styrene, vinyl-toluene, vinyl acetate; styrene derivatives such as α-methylstyrene, m-ethylstyrene and p-ethylstyrene; vinyl esters such as vinyl propionate, vinyl butyrate and vinyl caproate; diesters of unsaturated dicarboxylic acids such as maleic acid and fumaric acid with alkanols having 1 to 4 carbon atoms; acrylonitrile, methacrylonitrile, ethylene and vinyl esters of neo-acids, which esters have the formula:

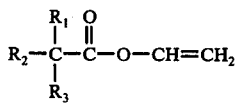

wherein $R_1$, $R_2$ and $R_3$ are straight chained alkyl groups having in total 4 to 26 carbon atoms, (for instance, "Veo Va" 10 of Shell Chemical Co.). For the actual practice of the present invention, these monomers are frequently used in combination in consideration of the properties of the specific coating material.

The polymerizable unsaturated monomers having a hydroxyl group of A(4) are necessary for the coating composition to be satisfactory in all the properties required by users, and include, for example, allyl alcohol, methallyl alcohol, hydroxyalkyl acrylates, such as 2-hydroxyethyl acrylate, hydroxypropyl acrylate and hydroxybutyl acrylate; hydroxyalkyl methacrylates, such as 2-hydroxyethyl methacrylate, hydroxypropyl methacrylate and hydroxybutyl methacrylate; N-methylolacrylamide and N-methylolmethacrylamide. Preferable are those monomers having 3 to 8 carbon atoms. The preferable amount of the A(4) component is from 2 to 20 parts by weight per 100 parts by weight of the copolymer.

The copolymers of the present invention can be produced by a method known per se, e.g. bulk polymerization, emulsion polymerization or solution polymerization. Preferably, the polymerization is carried out in a mixed solvent consisting of water and an alkanol such as methanol, ethanol or butanol, or a glycol derivative such as ethylene glycol monoethyl ether or diethylene glycol monoethyl ether, in an amount larger than the amount of water, at a temperature of 40° to 160° C. in the presence of an azo compound, peroxide or other polymerization initiator.

To the copolymer thus obtained is then added 0.5 to 2.0 equivalents of amines with respect to the carboxyl group contained in said copolymer, thereby rendering the copolymer water-soluble. The amines used in this case may be any of those which are conventionally added to resins having carboxyl groups to make the same soluble in water, e.g. ammonia, mono-, di or trialkylamine, such as methylamine, dimethylamine, trimethylamine, ethylamine, diethylamine or triethylamine; mono- or di-alkanolamine, such as ethanolamine or diethanolamine; and heterocyclic amines, such as morpholine or piperidine. The amines which may be used in the present invention have a boiling point of up to 268° C, preferably 60° – 160° C. In rendering the copolymer water-soluble, it is possible to use the amines in an amount of 0.5 equivalent or smaller or 2.0 equivalent or more with respect to the carboxyl group contained in said copolymer, but the use of the amines in such amounts will not bring about any specific advantage.

The term "amino resin" used herein has the meaning defined in The Condensed Chemical Dictionary, seventh edition (Reinhold Publishing Corporation, New York). That is, the amino resin refers to a large class of thermosetting resins made by the reaction of an amine with an aldehyde. As said aldehyde, there may be used formaldehyde, acetaldehyde, paraldehyde, butyraldehyde, acrolein, crotonaldehyde, benzaldehyde, furfural, etc. As said amine, there may be used preferably, urea, melamine, benzognanamine and dicyandiamide, or derivatives of these compounds. Amino resins having a not excessively high condensation degree are preferably used. Amino resins having the methylol groups partially or entirely etherified with alcohols, such as hexamethoxymethylmelamine, dimethoxymethylurea, etc., are excellent in miscibility with the copolymers of the present invention and in stability during storage at room temperature after the mixing. The amino resins are used more preferably in an amount of 4 to 50 parts by weight per the water-soluble salt of 100 parts by weight of the copolymer. An amount smaller than specified above will result in insufficient solvent-resistant property of the coating film formed, whereas an amount larger than specified above will generally result in brittleness of the formed coating film and an increase of unbalance of the physical properties thereof.

The coating materials according to the present invention may be applied by spray coating, brush coating, dip coating, roller coating or electrodeposition coating. Pigments and additives, which are usually used in water-soluble paints, may be used in amounts in which they are normally used. The pigments may be dispersed by a known method. Practically, the amount of a pigment used in the present invention varies largely depending upon the kind thereof and is preferably of the order of 0 to 300 parts by weight per 100 parts by weight of the resin solid component.

The amounts of water and organic solvents soluble in water, which are used in the production and application of the coating materials of this invention, are preferably such that the ratio of these components to the resin solid is about 95 : 5 to about 30 : 70. In the present invention, a considerable amount of water-soluble organic solvent is occasionally used for the synthesis of the copolymer component. However, it is sufficient to use water alone for the purpose of diluting the coating material to a suitable viscosity during the production and application thereof. The water-soluble organic solvents, which can be used for the synthesis of the copolymer component, and the production and application of the coating materials of this invention, are those which can be dissolved at least 2% by weight in water at 20° C, and include, e.g. alkanols, such as methanol, ethanol and propanol; glycol derivatives, such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether; cyclic ethers, such as dioxane; and ketones, such as acetone and diacetone alcohol.

The films obtained by applying the coating materials of the present invention are baked and dried at 90° and 200° C. for 1 to 50 minutes, preferably at 120° to 160° C. for 20 to 40 minutes, whereby excellent coating films can be obtained. During the baking and drying process, a condensation reaction between the carboxyl group in the copolymer and the amino resin takes place occasionally, in addition to the condensation reaction between the hydroxyl group in the copolymer and the amino resin, which constitutes the essential feature of the present invention. However, such condensation reaction is in no way detrimental to the properties of the coating films obtained with the coating materials of the present invention.

In the use of the coating materials of the present invention, such water-soluble resins as water-soluble alkyd resins and water-soluble modified phenol resins may be added thereto in an amount of up to 40 parts by weight per 100 parts by weight of the resin solid in the coating materials of the present invention, provided that the advantageous features of the present invention are not deteriorated.

The coating materials of the present invention are primarily applied to metals represented by iron and its alloys and aluminum and its alloys, but the materials to be coated are not necessarily restricted only to these.

Now, the present invention will be illustrated more specifically by reference to the following Examples, wherein all parts and percentages are by weight unless otherwise specified.

EXAMPLE 1

1-a.
Cardula E: 875.0 parts;
Methacrylic acid: 344.0 parts;
Ethylene glycol monoethyl ether 305.0 parts;
Hydroquinone 0.2 parts;
were charged into a reactor. Ethylene glycol monoethyl ether was added in order to prevent the temperature of the reaction system from rising unnecessarily high due to sudden occurrence of the reaction, and hydroquinone was added on order to inhibit the polymerization reaction at this stage. The reaction was carried out with stirring at a temperature of 140° to 150° C. The addition reaction between the epoxy group and the carboxyl group was traced while measuring the amount of carboxyl group remaining in the system. The addition reaction of the epoxy resin was accomplished in about 40 minutes.

1-b.
Solution of the product of the above-described addition reaction: 25.0 parts;
(addition reaction product): 20.0 parts;
Methacrylic acid: 15.0 parts;
2-Hydroxyethyl methacrylate: 10.0 parts;
Styrene: 7.0 parts;
Ethyl acrylate: 48.0 parts;
Ethylene glycol monoethyl ether: 40.0 parts;
Lauryl mercaptan: 1.5 parts;
were charged into a reactor. Lauryl mercaptan as a chain transfer agent was added for the purpose of adjusting the resultant copolymer solution to a viscosity suitable for the desired coating material. The reaction mixture was heated with stirring to a reflux condition, and while maintaining the reaction mixture under this condition, an initiator solution consisting of:
Azobisisobutyronitrile: 1.0 part;
Ethanol: 20.0 parts;
was dropped over a period of 2 hours to effect the polymerization reaction. Upon completion of the dropping, the reaction mixture was further refluxed with heat for 2 hours with stirring. Then, the temperature was lowered to 60° C. and a mixture consisting of:

28% aqueous ammonia: 13.0 parts;
Water: 25.0 parts;

was dropped over 10 minutes to obtain a water-soluble resin solution which contained 51% of non-volatile component and had a viscosity of $Z_2$ as measured by the Gardner Holdt viscometer.

A coating material was prepared by mixing 200 parts of the thus obtained water-soluble resin solution with 20 parts of Nikalac MW-30 (a trade name of Nippon Carbide Industrial Company, Ltd. for hexamethoxymethylmelamine), 20 parts of Rutile type titanium dioxide, 50 parts of basic lead chromate, 40 parts of calcium carbonate, 40 parts of red iron oxide and water in the amount necessary for adjusting the viscosity of the coating material during the preparation and coating operation by use of an ordinary ball mill, applied onto an iron plate by dip coating, and then baked at a temperature as shown in Table 1 for 30 minutes to obtain a baked film having a thickness of about 20 μ.

The resulting coating film was subjected to test for pencil hardness, impact test, Erichsen test, adhesive test, bending test and test for resistance to warm water, salt water, solvent (xylene), and alkali (5% NaOH solution) to obtain the results shown in Table 1.

EXAMPLE 2 (Comparison)

The same procedure as in Example 1 was repeated, except that the 2-hydroxyethyl methacrylate was not used, to obtain the results shown in Table 1.

EXAMPLE 3 (Comparison)

The same procedure as in Example 1 was repeated, except that the addition reaction product solution was not used, to obtain the results shown in Table 1.

Table 1

| | Example 1 | | | | Example 2 (Comparison) | | | | Example 3 (Comparison) | | | |
|---|---|---|---|---|---|---|---|---|---|---|---|---|
| Monomer composition (parts by weight) | | | | | | | | | | | | |
| Addition reaction product | 20 | | | | 20 | | | | 0 | | | |
| Methacrylic acid | 15 | | | | 15 | | | | 15 | | | |
| 2-Hydroxyethyl methacrylate | 10 | | | | 0 | | | | 10 | | | |
| Styrene | 7 | | | | 7 | | | | 7 | | | |
| Ethyl acrylate | 48 | | | | 48 | | | | 48 | | | |
| Baking (° C) | 100 | 120 | 140 | 160 | 100 | 120 | 140 | 160 | 100 | 120 | 140 | 160 |
| conditions (min) | 30 | 30 | 30 | 30 | 30 | 30 | 30 | 30 | 30 | 30 | 30 | 30 |
| Pencil hardness | 2H | 2H | 3H | 3H | 2B | B | H | H | H | H | 2H | 2H |
| Impact test (cm) | 40 | 40 | 40 | 40 | 20 | 30 | 30 | 30 | 20 | 20 | 20 | 20 |
| Erichsen test (cm) | 2.5 | 2.0 | 2.0 | 2.0 | 2.0 | 2.0 | 2.0 | 2.0 | 1.0 | 1.5 | 1.5 | 2.0 |
| Bending test (2 mm φ) | Sat | Sat | Sat | Sat | Sat | Sat | Sat | Sat | Not sat | Not sat | Not sat | Not sat |
| Adhesive property | Sat | Sat | Sat | Sat | Sat | Sat | Sat | Sat | Not sat | Not sat | Not sat | Not sat |
| Warm water resistance | Sat | Sat | Sat | Sat | Not sat | Not sat | Sat | Sat | Sat | Sat | Sat | Sat |
| Salt water resistance | Sat | Sat | Sat | Sat | Not sat | Sat | Sat | Sat | Not sat | Sat | Sat | Sat |
| Solvent resistance (xylene spot) | Sat | Sat | Sat | Sat | Not sat | Not sat | Not sat | Not sat | Not sat | Sat | Sat | Sat |
| Alkali resistance (5% NaOH solution) | Sat | Sat | Sat | Sat | Not sat | Not sat | Not sat | Sat | Not sat | Not sat | Not sat | Not sat |

Note:
1. Pencil hardness is indicated by the highest grade of hardness free of pencil mark according to usual method.
2. Impact test was conducted by means of a Du Pont Impact Tester using a 500-gram weight on a ½-inch diameter block.
3. Erichsen test was effected by means of an Erichsen testing machine in a known manner.
4. Bending test was made by bending the test specimen 180° on a bar having a diameter of 2 mm. "Sat" means satisfactory, and "Not sat" means not satisfactory in Table 1.
5. Adhesive property was tested by cutting the film with a needle to form 100 square individual pieces of 1 mm in width, bonding an adhesive tape thereon and quickly detaching said adhesive tape. When no square pieces were detached, the film is indicated "sat" which means satisfactory in Table 1. "Not sat" means not satisfactory.
6. Warm water resistance was tested by dipping the film in city water at 40° C for 240 hrs. In Table 1, "Sat" means satisfactory and "Not sat" means not satisfactory.
7. Salt water resistance was tested by dipping the film in a 3% salt water for 96 hrs. In Table 1, "Sat" means satisfactory and "Not sat" means not satisfactory.
8. Solvent resistance was tested by spotting the film with xylene and examining whether or not any change was caused until the xylene had been evaporated. "Sat" means no change and "Not sat" means that some change was caused in Table 1.
9. Alkali resistance was tested by dipping the film in a 5% aqueous NaOH solution for 24 hrs. "Sat" means no change and "Not sat" means that some change was caused in Table 1.

EXAMPLE 4

4-a.
Neoheptanoic acid: 130.0 parts;
Glycidyl methacrylate: 213.0 parts;
Ethylene glycol monoethyl ether: 38.5 parts;
Hydroquinone: 0.2 part;

were charged into a reactor and the temperature was elevated at 120° C. with stirring. By measuring the amount of the remaining carboxyl group, the addition reaction of carboxyl group and epoxy group was traced. 94% or more of neoheptanoic acid participated in the addition reaction in about 7 hours.

4-b.
Solution of the product of the above-described addition reaction: 11.0 parts;
Methacrylic acid: 13.0 parts;
2-Hydroxyethyl methacrylate: 10.0 parts;
Methyl methacrylate: 25.0 parts;
n-Butyl acrylate: 42.0 parts;
Ethylene glycol monoethyl ether: 40.0 parts;
Iso-butanol: 19.0 parts;
Lauryl mercaptan: 2.0 parts;

were charged into a reactor and a polymerization initiator solution consisting of
Azobisisobutyronitrile: 1.0 parts;
Dioxane: 30.0 parts;

was added in the same manner as in Example 1-b to effect the polymerization reaction. Further, 28% Aqueous ammonia: 13.0 parts;

was added to obtain a water-soluble resin solution containing 50% of non-volatile component and having a viscosity of $Z_2$.

A coating material was prepared by mixing 200 parts of the thus obtained water-soluble resin solution with 10 parts of Nikalac MW-30 and water in the amount necesssary for adjusting the viscosity of the coating material during the preparation and coating operation by use of an ordinary ball mill, applied onto an iron plate by dip coating, and then baked at 140° C for 30 minutes to obtain a baked coating film having a thickness of about 20 μ.

The resulting coating film was subjected to the same tests as in Example 1 to obtain the results shown in Table 2.

Table 2

| Example No. | 1 | 4 |
|---|---|---|
| Composition of coating material (parts by weight) | | |
| Resin solution prepared in the Example | 200.0 | 200.0 |
| Nikalac MW-30 | 20.0 | 10.0 |
| Rutile type titanium dioxide | 20.0 | — |
| Basic lead chromate | 50.0 | — |
| Calcium carbonate | 40.0 | — |
| Red iron oxide | 40.0 | — |
| Properties of coating film | | |
| Pencil hardness | 3H | 2H |
| Gloss | — | 92 |
| Impact test (cm) | 40 | 40 |
| Erichsen value (mm) | 2.0 | 4.0 |
| Adhesive property | Sat | Sat |
| Warm water-resistant property | Sat | Sat |
| Salt water-resistant property | Sat | Sat |

Note:
1. The meaning of "Sat" is the same as in Table 1.
2. The gloss of the film is indicated by the values obtained by a Murakami mirror plane reflectivity meter at an angle of 60 degree.

EXAMPLE 5

Into a reactor was charged 49.0 parts of ethylene glycol monobutyl ether and maintained at 130° C with stirring, into which a solution of 4.2 parts of azobisisobutylonitrile in a mixture of 56.0 parts of the addition reaction product solution obtained in Example 1-a, 36.0 parts of methacrylic acid, 6.0 parts of 2-hydroxyethyl methacrylate, 45.0 parts of styrene and 78.0 parts of n-butyl acrylate was dropped in 2 hours. The reaction temperature was maintained at about 130° C. After the completion of addition of said solution, a solution of 0.3 parts of azobisisobutylnitrile in 15.0 parts of ethylene glycol monobutyl ether was further dropped thereinto in 30 minutes. The resulting resin solution (87.5 parts) was mixed with 12.4 parts of triethylamine, 30.0 parts of hexamethoxymethylmelamine ("Cymel 300"), 70.0 parts of water and 30.0 parts of rutile type titanium oxide "R-820" to form a paint. The resulting paint was suitably diluted with water and then subjected to electrodeposition coating. The resulting coating film was baked at 140° C for 30 minutes to obtain a baked coating film having the following properties:

Thickness of film: 20 microns;
Pencile hardness: 2H;
Gloss (60°): 80;
Impact test: 50 cm;
Erichsen value: 5.0 mm;
Adhesive property: Satisfactory;
Warm water-resistant property: Satisfactory;
Salt water-resistant property: Satisfactory;

The substitution of 10.7 parts of morpholine or 7.5 parts of ethanolamine for the 12.4 parts of triethylamine brought about similar results.

EXAMPLE 6

6-1.

The addition reaction product obtained in Example 1-a: 25.0 parts;
Acrylic acid: 13.0 parts;
2-Hydroxypropyl methacrylate: 12.0 parts;
Styrene: 10.0 parts;
2-Ethylhexyl acrylate: 45.0 parts;
Methyl ethyl ketone: 30.0 parts;
Lauryl mercaptan: 2.0 parts;

These components were charged into a reactor, and a solution consisting of:

Azobisisobutyronitrile: 1.0 parts;
Ethyl alcohol: 20.0 parts;

was added thereto in the same manner as in Example 1-b. The resulting mixture was subjected to polymerization reaction in the same manner as in Example 1-b.

To the resulting mixture was added to an aqueous solution consisting of:

Morpholine: 20.0 parts;
Water: 75.0 parts;

to obtain a water-soluble resin solution containing 41% of non-volatile matter and having a viscosity of Y as measured by the Gardner Holdt viscometer.

6-2.

30 parts of urea, 126 parts of melamine and 486 parts of a 37% aqueous solution of formaldehyde were mixed together and the resulting mixture was adjusted to a pH of 8.5 by means of triethylamine, and then subjected to reaction at 80° C. When the polycondensation rate reached 15%, the reaction was stopped to obtain a water-soluble, methylolated urea-melamine resin solution containing 48% of non-volatile matter.

6-3.

The addition reaction product solution obtained in 6-1: 200.0 parts;
The water-soluble, methylolated, urea-melamine resin solution obtained in 6-2: 20.0 parts;
Rutile type TiO$_2$ 25.0 parts;
Water 25.0 parts;

These components were mixed to obtain a water-soluble paint. A suitable amount of water was added to the resulting paint to dilute the paint, and the resulting diluted paint was applied onto a thin iron plate and then baked at 160° C for 20 min. The thus obtained baked coating film had a pencil hardness of 2H and excellent gloss and was satisfactory in water-resistance.

What is claimed is:

1. A process for preparing a coating composition containing water, a water-soluble, organic solvent and a water-soluble thermosetting resin, which comprises preparing a mixture of
   (1) 5 to 30 parts by weight of an α,β-ethylenically unsaturated carboxylic acid having 3 to 5 carbon atoms or a monoester thereof with an alkanol having 1 to 4 carbon atoms,
   (2) 5 to 50 parts by weight of an addition product of a polymerizable α,β-ethylenically unsaturated carboxylic acid having 3 to 5 carbon atoms with a glycidyl ester of a tertiary aliphatic monocarboxylic acid, or an addition product of a monoglycidyl ester of a polymerizable, α,β-ethylenically unsaturated carboxylic acid having 3 to 5 carbon atoms with a tertiary aliphatic monocarboxylic acid, wherein said tertiary aliphatic group contains 4 to 25 carbon atoms, (3) 40 to 90 parts by weight of a hydroxy-free polymerizable unsaturated monomer having 2 to 30 carbon atoms, and (4) up to 20 parts by weight of a polymerizable unsaturated monomer having a hydroxyl group and 3 to 8 carbon atoms, heating the resulting mixture in the presence of a polymerization initiator to form a copolymer, adding to the resulting copolymer 0.5 to 2.0 equivalents of an amine with respect to the carboxyl group in said copolymer to form a water-soluble salt, and then mixing the resulting salt with 4 to 50 parts by weight of a water-soluble amino resin, based on 100 parts by weight of said copolymer.

2. A process according to claim 1, wherein the glycidyl ester of tertiary aliphatic monocarboxylic acid is a compound represented by the formula:

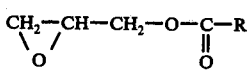

wherein R is a tertiary alkyl group having 4 to 26 carbon atoms.

3. A process according to claim 1, wherein the glycidyl ester of polymerizable $\alpha,\beta$-ethylenically unsaturated carboxylic acid is glycidyl acrylate, glycidyl methacrylate or a mixture thereof.

4. A process according to claim 1, wherein the tertiary aliphatic monocarboxylic acid is a compound represented by the formula:

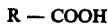

wherein R represents a tertiary alkyl group having 4 to 26 carbon atoms.

5. A process according to claim 1, wherein the polymerizable unsaturated monomer having a hydroxyl group is 2-hydroxyethyl methacrylate.

6. A process according to claim 1, wherein the amount of the polymerizable unsaturated monomer having a hydroxyl group is 2 to 20 parts by weight.

7. A coating composition containing water, a water-soluble, organic solvent, and a water-soluble, thermosetting resin as essential, film-forming component, which resin is the mixture of (A) a water-soluble salt of 100 parts by weight of copolymer obtained by the copolymerization of (1) 5 to 30 parts by weight of an $\alpha,\beta$-ethylenically unsaturated carboxylic acid having 3 to 5 carbon atoms or a monoester thereof with an alkanol having 1 to 4 carbon atoms, (2) 5 to 50 parts by weight of an addition reaction product of an epoxy group of a monoglycidyl ester of a polymerizable $\alpha,\beta$-ethylenically unsaturated carboxylic acid having 3 to 5 carbon atoms with a tertiary aliphatic monocarboxylic acid, wherein the tertiary aliphatic group contains 4 to 26 carbon atoms, said addition product having a hydroxyl group.

(3) 40 to 90 parts by weight of a hydroxy-free polymerizable unsaturated monomer having 2 to 30 carbon atoms, and (4) up to 20 parts by weight of a polymerizable unsaturated monomer having a hydroxyl group and 3 to 8 carbon atoms, with 0.5 to 2.0 equivalents of an amine with respect to the carboxyl groups in said copolymer, and (B) 4 to 50 parts by weight of a water-soluble amino resin.

8. A coating composition according to claim 7, wherein the $\alpha,\beta$-ethylenically unsaturated carboxylic acid is acrylic acid, methacrylic acid, crotonic acid, itaconic acid, maleic acid, maleic anhydride, fumaric acid, or a monoester of one of these acids with an alkanol having 1 to 4 carbon atoms.

9. A coating composition according to claim 7, wherein the $\alpha,\beta$-ethylenically unsaturated carboxylic acid is methacrylic acid, acrylic acid or a mixture of these acids.

10. A coating composition according to claim 7, wherein the addition product is a reaction product of glycidyl methacrylate, glycidyl acrylate or a mixture thereof, with a tertiary aliphatic monocarboxylic acid in which the tertiary aliphatic group has 4 to 26 carbon atoms.

11. A coating composition according to claim 7, wherein the tertiary aliphatic carboxylic acid is neopentanoic acid, neoheptanoic acid, neodecanoic acid, neotridecanoic acid or a mixture of saturated, mainly tertiary monocarboxylic acids of $C_9$, $C_{10}$, $C_{11}$ in chain length.

12. A coating composition according to claim 7, wherein the hydroxy-free polymerizable unsaturated monomer is at least one monomer selected from the group consisting of acrylates and methacrylates of alkanols having 1 to 16 carbon atoms, styrene, vinyltoluene, vinyl acetate, styrene derivatives, vinyl esters, diesters of unsaturated dicarboxylic acids with alkanols having 1 to 4 carbon atoms, acrylontrile, methacrylonitrile, ethylene and vinyl esters of neoalkanoic acids having 7 to 29 carbon atoms.

13. A coating composition according to claim 7, wherein the hydroxy-free polymerizable unsaturated monomer is an acrylate or methacrylate of an alkanol having 1 to 16 carbon atoms.

14. A coating composition according to claim 7, wherein the hydroxy-free polymerizable unsaturated monomer is styrene or a mixture of styrene and at least one monomer selected from the group consisting of acrylates and methacrylates of alkanols having 1 to 16 carbon atoms.

15. A coating composition according to claim 7, wherein the amount of the polymerizable unsaturated monomer having a hydroxyl group and 3 to 8 carbon atoms is 2 to 20 parts by weight.

16. A coating composition according to claim 7, wherein the polymerizable unsaturated monomer having a hydroxyl group is 2-hydroxyethyl methacrylate, allyl alcohol, methallyl alcohol, 2-hydroxyethyl acrylate, hydroxypropyl acrylate, hydroxybutyl acrylate, hydroxypropyl methacrylate, hydroxybutyl methacrylate, N-methylolacrylamide or N-methylolmethacrylamide.

17. A coating composition according to claim 7, wherein the polymerizable unsaturated monomer having a hydroxyl group is 2-hydroxyethyl methacrylate.

18. A coating composition according to claim 7, wherein the the amine to form the water-soluble salt has a boiling point of 60° to 160° C.

19. A coating composition according to claim 7, wherein the amine to form the water-soluble salt is ammonia, methylamine, dimethylamine, trimethylamine, ethylamine diethylamine, triethylamine, ethanolamine, diethanolamine or morpholine.

20. A coating composition according to claim 7, wherein the water-soluble amino resin is a reaction product or urea, melamine, benzoguanamine or dicyandiamide with formaldehyde, acetaldehyde, paraldehyde, butyraldehyde, acrolein, crotonaldehyde, benzaldehyde or furfural.

21. A coating composition according to claim 7, wherein the water-soluble amino resin is hexamethoxymethylmelamine or a reaction product or urea, melamine and formaldehyde.

22. A coating composition according to claim 7, wherein the water-soluble organic solvent is a solvent which can be dissolved at least 2% by weight in water at 20° C.

23. A coating composition according to claim 7, wherein the water-soluble organic solvent is methanol, ethanol, propanol, ethylene glycol monomethyl ether, ethylene glycol mononethyl ether, ethylene glycol monobutyl ether, diethylene glycol monomethyl ether, diethylene glycol monoethyl ether, diethylene glycol monobutyl ether, dioxane, acetone or diacetone alcohol.

24. A process for preparing a coating composition containing water, a water-soluble, organic solvent and a water-soluble thermosetting resin, which comprises preparing a mixture of
(1) 5 to 30 parts by weight of an $\alpha, \beta$-ethylenically unsaturated carboxylic acid having 3 to 5 carbon atoms or a monoester thereof with an alkanol having 1 to 4 carbon atoms;
(2) 5 to 50 parts by weight of an addition product of a monoglycidyl ester of a polymerizable, $\alpha, \beta$-ethylenically unsaturated carboxylic acid having 3 to 5 carbon atoms with a tertiary aliphatic monocarboxylic acid wherein said tertiary aliphatic group contains 4 to 26 carbon atoms,
(3) 40 to 90 parts by weight of a hydroxy-free polymerizable unsaturated monomer having 2 to 30 carbon atoms, and
(4) up to 20 parts by weight of a polymerizable unsaturated monomer having a hydroxyl group and 3 to 8 carbon atoms, heating the resulting mixture in the presence of a polymerization initiator to from a copolymer, adding to the resulting copolymer 0.5 to 2.0 equivalents of an amine with respect to the carboxyl group in said copolymer to form a water-soluble salt, and then mixing the resulting salt with 4 to 50 parts by weight of a water-soluble amino resin, based on 100 parts by weight of said copolymer.

25. A process according to claim 24, wherein the tertiary aliphatic monocarboxylic acid is a compound represented by the formula:

R—COOH wherein R represents a tertiary alkyl group having 4 to 26 carbon atoms.

26. A process according to claim 24, wherein the polymerizable unsaturated monomer having a hydroxyl group is 2-hydroxyethyl methacrylate.

27. A process according to claim 24, wherein the amount of the polymerizable unsaturated monomer having a hydroxyl group is 2 to 20 parts by weight.

28. An article having coated thereon a hardened film of the coating composition as claimed in claim 7.

* * * * *